US012084319B2

(12) United States Patent
Brenner et al.

(10) Patent No.: US 12,084,319 B2
(45) Date of Patent: Sep. 10, 2024

(54) METHOD AND DEVICE FOR CONTROLLING A MATERIALS HANDLING AND/OR CONSTRUCTION MACHINE

(71) Applicant: Liebherr-Werk Biberach GmbH, Biberach an der Riss (DE)

(72) Inventors: Stefan Brenner, Weissenhorn (DE); Markus Hofmeister, Warthausen (DE)

(73) Assignee: Liebherr-Werk Biberach GmbH, Biberach an der Riss (DE)

( * ) Notice: Subject to any disclaimer, the term of this patent is extended or adjusted under 35 U.S.C. 154(b) by 391 days.

(21) Appl. No.: 17/449,062

(22) Filed: Sep. 27, 2021

(65) Prior Publication Data

US 2022/0119233 A1 Apr. 21, 2022

Related U.S. Application Data

(63) Continuation of application No. PCT/EP2020/059489, filed on Apr. 3, 2020.

(30) Foreign Application Priority Data

Apr. 3, 2019 (DE) ..................... 10 2019 108 689.2

(51) Int. Cl.

| | |
|---|---|
| ***B66C 23/90*** | (2006.01) |
| ***B66C 13/44*** | (2006.01) |
| ***B66C 15/04*** | (2006.01) |
| ***B66C 23/94*** | (2006.01) |

(Continued)

(52) U.S. Cl.

CPC ............ *B66C 23/905* (2013.01); *B66C 13/44* (2013.01); *B66C 15/045* (2013.01); *B66C 23/94* (2013.01);

(Continued)

(58) Field of Classification Search

CPC ....... B66C 13/40; B66C 13/44; B66C 15/045; B66C 23/905; B66C 23/94; E02F 9/2033;

(Continued)

(56) References Cited

U.S. PATENT DOCUMENTS

2014/0031954 A1* 1/2014 Gerhardy .................. E02F 9/26 700/83
2018/0057318 A1 3/2018 Benton et al.

(Continued)

FOREIGN PATENT DOCUMENTS

CN 102216534 10/2011
CN 108594281 9/2018

(Continued)

*Primary Examiner* — Kidest Bahta
(74) *Attorney, Agent, or Firm* — Levine Bagade Han LLP

(57) ABSTRACT

A method for controlling a materials handling and/or construction machine, such as a crane or cable excavator, wherein different control functions are selected on a screen of a controller with a touchscreen function by touching a control function symbol, and respective functional parameters of the selected control function are set. A working region boundary of a working region delimiting function for automatically deactivating and/or slowing down at least one actuator is displayed on the screen together with a display of the materials handling and/or construction machine and/or the work surroundings in the form of a touchscreen display element when the working region boundary is reached and is adjusted by touching and moving the working region boundary on the screen relative to the display of the materials handling and/or construction machine and/or the work surroundings thereof.

22 Claims, 5 Drawing Sheets

(51) Int. Cl.
*E02F 9/24* (2006.01)
*E02F 9/26* (2006.01)

(52) U.S. Cl.
CPC ................ *E02F 9/24* (2013.01); *E02F 9/262* (2013.01); *E02F 9/265* (2013.01)

(58) Field of Classification Search
CPC ... E02F 9/24; E02F 9/262; E02F 9/265; E02F 3/00; E02F 1/00; E02F 7/00; E02F 9/00
See application file for complete search history.

(56) References Cited

U.S. PATENT DOCUMENTS

| | | | | |
|---|---|---|---|---|
| 2018/0326592 | A1* | 11/2018 | Kogan | B25J 9/1674 |
| 2018/0329618 | A1* | 11/2018 | Wieckhorst | A01B 69/007 |
| 2019/0039862 | A1* | 2/2019 | Palberg | B66C 13/40 |

FOREIGN PATENT DOCUMENTS

| | | | | |
|---|---|---|---|---|
| DE | 220581 | | 4/1985 | |
| DE | 102014216982 | | 3/2016 | |
| DE | 102016011354 | A1 * | 3/2018 | B60H 1/00357 |
| DE | 102016012786 | | 4/2018 | |
| DE | 102017104427 | | 9/2018 | |
| DE | 102017110715 | | 11/2018 | |
| EP | 3309110 | | 4/2018 | |
| EP | 3428112 | | 1/2019 | |
| EP | 3556712 | | 10/2019 | |
| RU | 2326806 | C1 | 6/2008 | |
| WO | WO 2018/077459 | | 5/2018 | |
| WO | WO-2018171983 | A1 * | 9/2018 | B66C 13/16 |
| WO | WO 2020/201473 | | 10/2020 | |

* cited by examiner

- Selecting a boundary figure

- Selection of an already taught boundary figure

- Adding a teach point

- Moving a teach point

METHOD AND DEVICE FOR CONTROLLING A MATERIALS HANDLING AND/OR CONSTRUCTION MACHINE

CROSS-REFERENCE TO RELATED APPLICATIONS

This application is a continuation of International Patent Application Number PCT/EP2020/059489 filed Apr. 3, 2020, which claims priority to German Patent Application Number DE 10 2019 108 689.2 filed Apr. 3, 2019, the contents of which are incorporated herein by reference in their entireties.

BACKGROUND

The present invention relates to a method and a device for controlling a materials handling and/or construction machine, such as a crane or cable excavator, wherein different control functions are selected on a screen of a controller with a touchscreen function by touching a control function symbol, and respective function parameters of the selected control function are set. The invention also relates to a materials handling and/or construction machine, such as a crane or cable excavator with such a controller.

For controlling construction machines such as cranes or cable excavators or other materials handling machines such as surface miners, controllers with touchscreen displays have been used increasingly in recent times to enable more intuitive operation. In order to keep the control clear and to avoid cluttering the screen representation with details that right then are not necessarily needed, provision can be made for a menu control that makes different control functions selectable and, after selection, displays larger or additional information on the screen in the form of a pop-up screen window. For example, different control function symbols may be displayed in a narrow border bar of the screen representation to select a specific control function by tapping a control function symbol. In the respective selected control function, functional parameters can then be set or changed by entering corresponding information via the touchscreen display.

On the one hand, this selectability of different control functions improves the clarity of the screen representation. On the other hand, incorrect operation is also prevented or at least made more difficult, since control parameters are not unintentionally adjusted by accidentally touching the touchscreen display.

A controller with a touchscreen surface for a crane is known, for example, from the document DE 10 2014 216 982 A1, wherein, to avoid unwanted control commands due to unintentional touching of the touchscreen surface, it is proposed therein to use an additional confirmation button to confirm control commands that is implemented by an additional hardware module dockable at the tablet computer.

Another controller with a touchscreen display for a crane is shown in DE 10 2016 012 786 A1, wherein it is proposed to control travel movements of the crane by, for example, tapping the lifting hook and pushing the lifting hook on the display.

Despite said efforts using touchscreen interfaces, several control functions of construction machinery are still difficult to operate. Due to the complex machine functions, the effects of individual function parameters and their adjustment are often difficult to estimate, so that, especially in the case of safety-relevant functions, a classic teach-in process by a very experienced machine operator is still relied upon for their adjustment. If, for example, the working range limits are to be programmed when setting up a crane, the experienced crane operator approaches the rotational positions and luffing positions of the jib in order to then store the approached position as the working region boundary so that the crane brakes and/or stops when approaching or reaching the limit again in regular operation. Similarly, with other control functions, it is difficult even for experienced machine operators to set the desired function parameters appropriately, especially when it comes to control functions that are not used on a daily basis, such as setting the operating parameters for different wind situations or ballasting for different wind zones.

It is the underlying object of the present invention to provide a materials handling and/or construction machine of said type and an improved method and device for controlling the same that avoid disadvantages of the prior art and advantageously further develop the latter. In particular, it is intended to facilitate the operation of complex control functions of such materials handling and/or construction machines.

Said task is solved, in accordance with the invention, as claimed.

SUMMARY

Thus, according to one aspect of the present application, it is first proposed to use the touchscreen display for setting the working region delimiting function, which is typically difficult to handle, wherein the touchscreen display is used not only to input a store command to store an actual approached machine position, but a virtual shifting and/or shaping of the working region boundary is performed on the display itself to avoid an actual approach of the boundary positions in a time-consuming teach-in process. According to the invention, a working region boundary of the working region delimiting function, which automatically deactivates and/or slows down at least one actuator when the working region boundary is reached, is displayed on the screen together with a representation of the materials handling and/or construction machine and/or the work surroundings thereof in the form of a touchscreen display element, so that the working region boundary can be adjusted by touching and moving on the screen relative to the materials handling and/or construction machine and/or the work surroundings thereof. The working region boundary, whose position and contour are clearly visible to the machine operator through the display together with the machine and its work surroundings, can be activated for an adjustment by tapping on the screen and changed by moving it on the screen, so that the working region boundary no longer has to be approached by an actual machine movement and the approached position has to be remembered as the working region boundary. Rather, the definition of the working region boundary is performed virtually on the touchscreen display against the background of the materials handling and/or construction machine and/or its work surroundings displayed on the touchscreen display.

In further embodiments of the invention, not only the position and orientation of the working region boundary, but also its contour or shape can be changed on the touchscreen display. Depending on the obstacles to be taken into account and the adjustment options offered by the construction machine or the materials handling machine, a straight course of the working region boundary can be changed into a curved, arc-shaped course or vice versa by touching the touchscreen display and its screen control functions. Alternatively or additionally, for example, the contour, that is, the outline of a work boundary area can be changed, for example, from a circular sector to a rectangular boundary region or this in turn to a triangular boundary region, by touching the touchscreen display surface and changing the contour of the displayed working region boundary.

In an advantageous further embodiment of the invention, in order to avoid having to laboriously create the entire contour progression from scratch by tapping and swiping on the screen, a selection of different differently shaped selection contours for the working region boundary can be displayed on the touchscreen display, so that by touching a particular selection contour on the screen that most closely matches the desired working region boundary, the contour and shape of the working region boundary ca be preconfigured. For example, rectangular, circular sector, and arc strip selection contours may be provided on the touchscreen display in the form of touchscreen display elements to easily select working region boundaries for commonly encountered obstacles such as rectangular houses, slewing area boundaries for a crane, or roads or paths to be kept clear.

In a second contouring step, the preselected contour can then be finely reshaped, in particular by deforming and/or adding to or reconfiguring the preselected touchscreen element by touch moving certain display element sections on the screen.

In order to be able to make any adjustment to the shape or contour of a working region boundary, the touchscreen display element symbolizing the working region boundary on the screen may be adapted to change its shape by touching and wiping it along the screen. For example, the touchscreen display element may be configured to trace or adjust the path of the contour when a contour point of the displayed working region boundary is touched and moved on the screen such that the working region boundary extends from two adjacent, non-displaced contour points to the displaced contour point.

For example, said touchscreen display element that displays the trajectory of the working region boundary may be configured to hold two contour points of the working region boundary by tapping each on the screen with a finger, and to move an intermediate contour point to a new position by tapping and wiping along on the screen relative to the other two held contour points. The controller then recalculates the course of the working region boundary so that the working region boundary runs from the two fixed contour points to the new, displaced contour point.

Moving the working region boundary or a contour point of the working region boundary does not necessarily have to be done by wiping along the screen, even though this allows fine control in a particularly intuitive way. Alternatively or additionally, the touchscreen display controller may also be adapted to allow displacement by tapping two screen points, for example in such a way that a particular contour point of the working region boundary is first tapped on the screen to select it for displacement, whereupon the new desired position of said contour point is determined by tapping another point of the touchscreen display.

In order to avoid an unintentional displacement of the working region boundary or of a contour point, it can be provided that a displacement only takes place in response to a certain sequence of tapping and/or wiping movements, for example in such a way that a certain contour point must first be tapped twice in the manner of a double-click and then a wiping movement must take place on the screen. Alternatively or additionally, for example, a prolonged tap, for example over more than 5 seconds, on a particular contour point of the working region boundary may be required to select it for moving and to focus the displacement mode. If a second, different screen point is then tapped, said moving takes place.

Alternatively or additionally, a change in the contouring or shape and/or position or course of a working region boundary can also be effected by adding an additional contour point, whereupon the controller determines the working region boundary by calculation, starting from two adjacent contour points and passing through the new, added contour point. In this way, for example, a triangular boundary region can easily be made into a square boundary region, or a straight-line working region boundary can be made into a bent, polygonal working region boundary. In order to add a new contour point, for example, a function symbol "Add contour point" can be offered in a menu bar at the edge, the touching of which signals the controller that the next touch of the screen should set a new contour point. In principle, however, this would also be possible in another way, e.g. by touching the screen in a certain way at the contour point to be added, e.g. by tapping three times or tapping twice with holding the point for a longer time.

Alternatively or additionally, the controller may in principle execute different change modes for changing different parameters of the working region boundary or the work limiting region depending on different operation modes of the touchscreen display. In particular, merely moving a working region boundary or a work limiting region can be controlled by operating the touchscreen differently than changing the shape or contour of the working region boundary.

For example, the contour of the working region boundary can be changed by tapping once for a longer period of time, e.g. more than 5 seconds, and then wiping along the screen, e.g. by moving the contour point accordingly and recalculating the boundary to neighboring points that have not been moved. For example, to move the working region boundary or the entire boundary area without changing the contour of the position relative to the construction machine and/or its work surroundings, a double or triple tap of the working region boundary or area may be required, whereupon a subsequent wiping along the screen is interpreted as a move command.

Alternatively or additionally, for example, a shifting movement on the screen by one finger can be interpreted as a control command for changing a contour, while two spaced fingers touching the screen and moving together in one direction are interpreted as a control command for shifting without changing a contour.

According to another aspect of the present application, in the event of more complex parameter settings or operating errors, additional assistance is provided to the machine operator on an additional screen so as not to interfere with the setting process on the touchscreen display or not to interfere with the understanding of the display shown there by overlaying it with a help menu. Advantageously, a machine-readable code is displayed on the touchscreen display for a respective control function selected on the touchscreen display, which code displays additional information on the selected control function or causes it to be displayed on the mobile terminal device by scanning it using a mobile terminal device. At first glance, it would appear simpler to display a help or information symbol on the touchscreen display and, when tapped, to display corresponding additional information on the touchscreen display itself. However, such a display of additional information in the manner of a pop-up window on the touchscreen display itself impairs the control function displayed there and the ability to grasp it. By displaying the information on a separate mobile terminal device, the machine operator can call up additional information on the mobile terminal device if required and at the same time continue working in the setting menu of the touchscreen display.

The machine-readable code may be, for example, a QR code or, optionally, a bar code that is displayed on the screen of the controller and can be scanned by the camera of a mobile terminal, such as a tablet or a mobile phone. The code scanned on the mobile terminal causes the mobile terminal to call up specific additional information that is stored on the mobile terminal but can also be downloaded via a network connection from a locally remote server or database. For example, a scanned QR code can cause the mobile device to call up a specific web page via an Internet connection, which then displays the coveted additional information.

In an advantageous further embodiment of the invention, the machine-readable code may be automatically displayed on the screen of the controller in the event of an operating error and/or when an unexpected control command is entered, optionally together with an explanatory text message to prompt or indicate to the machine operator that additional information is displayed by scanning the displayed code on a mobile terminal.

Alternatively or additionally, however, the controller may be such that said machine-readable code is displayed upon specific request and input of a corresponding control command by the machine operator. For example, a help and/or information symbol may be provided on the controller screen in the form of a touchscreen display element. Upon touching or tapping said help and/or information symbol, the controller screen then displays said machine readable code.

In order to make intuitive operation even easier for the machine operator, it is helpful if, in further development of the invention, the work surroundings of the construction machine of the materials handling and/or construction machine, possibly together with the machine or relevant parts thereof against the background of the work surroundings, is displayed as realistically as possible on the screen.

In this regard, the controller may be configured to receive image data from a camera and/or digital data from a building information model, a so-called BIM, and/or to display a representation of the machine environment and/or of a work tool of the machine with respect to the received image data of the camera and/or to the digital data of the building information model, and to display the input means for inputting control commands in the form of the touchscreen element on the screen at least at times simultaneously with the presentation of the machine environment and/or of the work tool. The screen can therefore simultaneously serve as a monitor for observing the work surroundings and/or the work tool of the remote-controlled machine, on the one hand, and as a control panel for displaying and inputting control commands, on the other hand. A more comfortable and safer operation can hereby be achieved since the work surroundings in which the settings are to be carried out is also presented to the machine operator on the observation of the input interface for the control commands without the machine operator having to move his gaze to and fro.

Especially when setting the working range limits as described above, it is helpful to see them in or in front of the realistically represented work surroundings, if necessary together with the theoretically possible working range of the respective machine.

Said input means for inputting control commands in the form of a touchscreen display element can here advantageously be directly faded into the representation of the machine environment and/or of the work tool in the manner of a superposed representation so that the touchscreen display element is so-to-say shown against the background of the displayed working surroundings or machine surroundings on the screen of the tablet computer.

Alternatively or additionally to such touchscreen display elements faded into the image of the work surroundings, it is, however, likewise possible to present said touchscreen display elements for the inputting of control commands in a separate window on the screen of the tablet computer, said window, for example, being permanently displayed at an edge of the screen or being invokable as required in the manner of a pop-up window and being placed over the window of the image representation of the machine environment.

The image of the machine environment and/or of the working area and/or of the building to be erected and/or of the work tool of the machine presented on the screen of the tablet computer can advantageously also comprise a virtual representation that is generated from a construction site information model using building information and/or construction site information. For this purpose, the controller can comprise a graphical simulation module for calculating the virtual representation, with such a graphical simulation module advantageously being able to be connected to a data interface at the controller for importing the building information and/or construction site information. An image processing device of the controller can comprise for generating and/or adapting the virtual representation of the machine environment and/or of the building and/or of the work tool from the construction site information model in dependence on the imported digital data.

The controller can here advantageously comprise a CAD interface as the data interface by means of which CAD data can be imported into the tablet computer with reference to which a virtual representation can be generated on the screen by the simulation model. Alternatively or additionally, the controller can comprise an image data interface by means of which digital image data can be imported with reference to which then the virtual representation of the machine environment and/or of the work tool and/or of the building can be generated by said image processing device.

However, advantageously, not only virtual representations can be displayed on the screen, but also actual images of a camera can be shown. To display an image that is as realistic as it is informative and with reference to which the machine operator looking at the screen can intuitively control the machine, the controller may, in an advantageous further development of the invention, comprise a display control apparatus by means of which a superposed screen presentation in the manner of a virtual reality image can be generated on the screen that is assembled from the received image data of a camera and the received digital data from said construction site information model BIM and thus from a camera image of the machine environment, on the one hand, and from a virtual representation of the machine environment or of a building part, on the other hand.

With such an assembled virtual reality image that is displayed on the screen and that is optionally augmented by the previously explained touchscreen display elements for inputting control commands, the actual image of a construction site provided by one or more cameras can, for example, be supplemented by contours of a building still to be erected so that the machine operator knows precisely where to move a respective touchscreen display element, in particular said working region boundary. In this respect, building contours already present in the actual image and virtual building contours that correspond to the next workstep can be supplemented so that the contour to be erected in the next workstep is displayed in the shown actual image on the screen.

Alternatively or additionally, for example, certain positions such as a delivery station for elements, a storage position for components, or boundaries of the permitted work area can also be faded in on the actual camera image of the work surroundings of the machine to be controlled.

The camera-generated representation of the work surroundings of the machine can be a cyclically updated image that is provided in the manner of a webcam or can also be a continuously streamed live image.

Such a real camera-generated representation of the machine environment and/or of the piece of working equipment can in particular be produced in the form of a live image or of a TV picture-like video image, wherein a corresponding video signal is transmitted from the at least one camera at the remote controlled machine to the controller and shown by the screen thereof.

BRIEF DESCRIPTION OF THE DRAWINGS

The invention is explained in more detail below on the basis of a preferred exemplary embodiment and the corresponding drawings.

DETAILED DESCRIPTION

Figure 1:
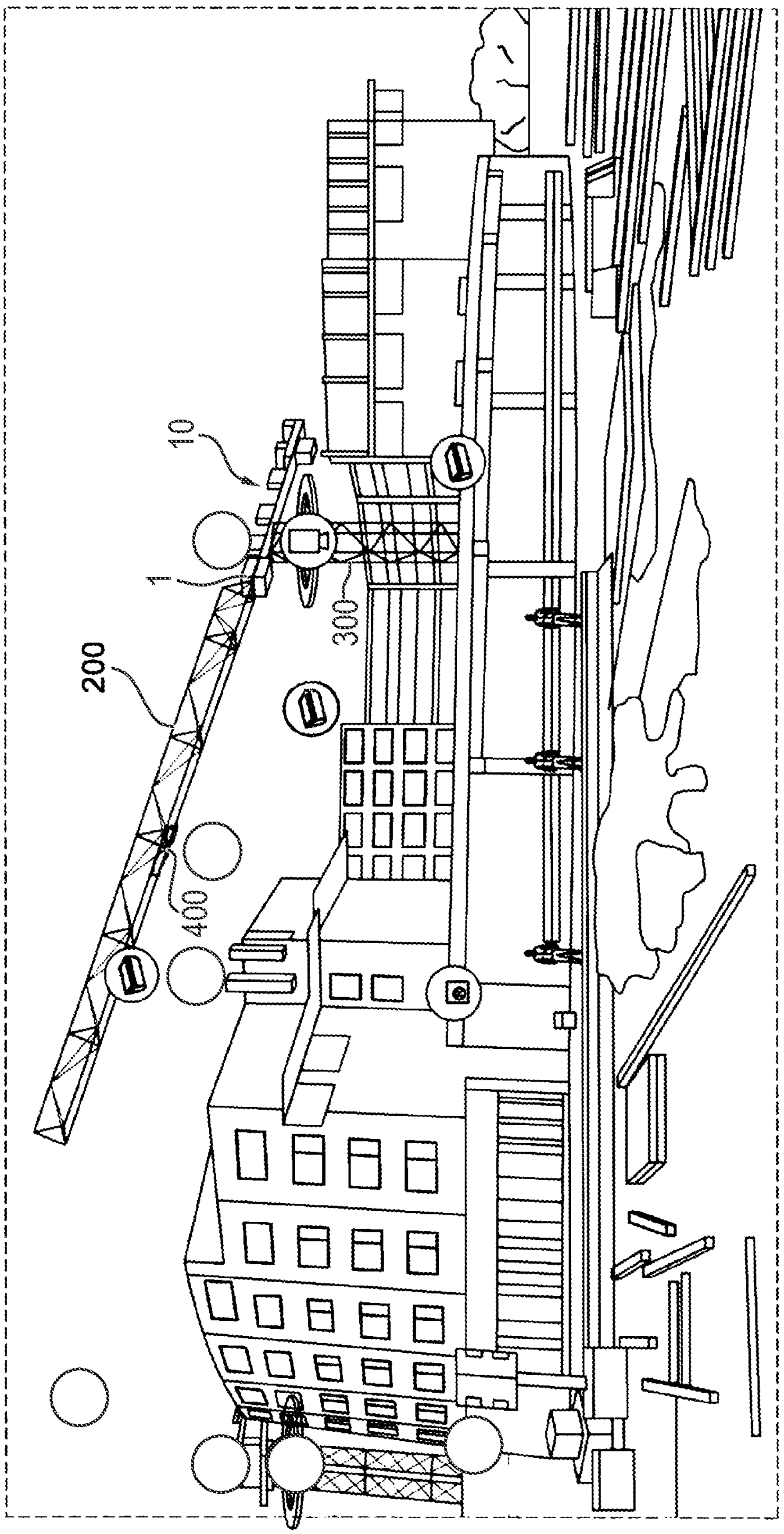
FIG. 1 illustrates a perspective view of a construction machine in the form of a crane at a construction site, which requires working region boundary for the crane.

As FIG. 1 shows, the materials handling and construction machine may be a crane 10 used at a construction site 100. The buildings to be erected on the construction site 100, as well as other materials handling and/or construction equipment such as other cranes, cable excavators and the like, create obstacles for the movements of the crane 10. To prevent collisions, working region boundaries are specified for the crane 10, and when these boundaries are reached or exceeded, one or more drive devices of the crane 10 with which the crane 10 is moved are deactivated or at least slowed down.

For example, as FIG. 1 shows, the crane 10 may be configured as a revolving tower crane, the boom 200 of which is supported by a tower 300, the tower together with the boom or the boom 200 being rotatable relative to the tower 300 about an upright axis by a slewing drive. A trolley 400, which is only indicated, may be mounted on the boom 200 and is movable along the longitudinal axis of the boom 200 by a trolley drive. A hoisting cable with a lifting hook extends from the trolley 400, which can be raised and lowered by spooling or unwinding the hoisting cable from a hoist drive.

In order to comply with said working region boundary, an electronic controller 1 may stop one or more of said drives, that is, for example, the slewing gear drive and/or the cross travel drive and/or the hoisting gear drive and slow them down before reaching a working region boundary. Said controller 1 may be electronic in nature, and may include a microprocessor or other processor capable of processing from an electronic memory device a program block stored therein. Said controller 1 may be part of the crane control system integrated in the crane 10.

Figure 2A:
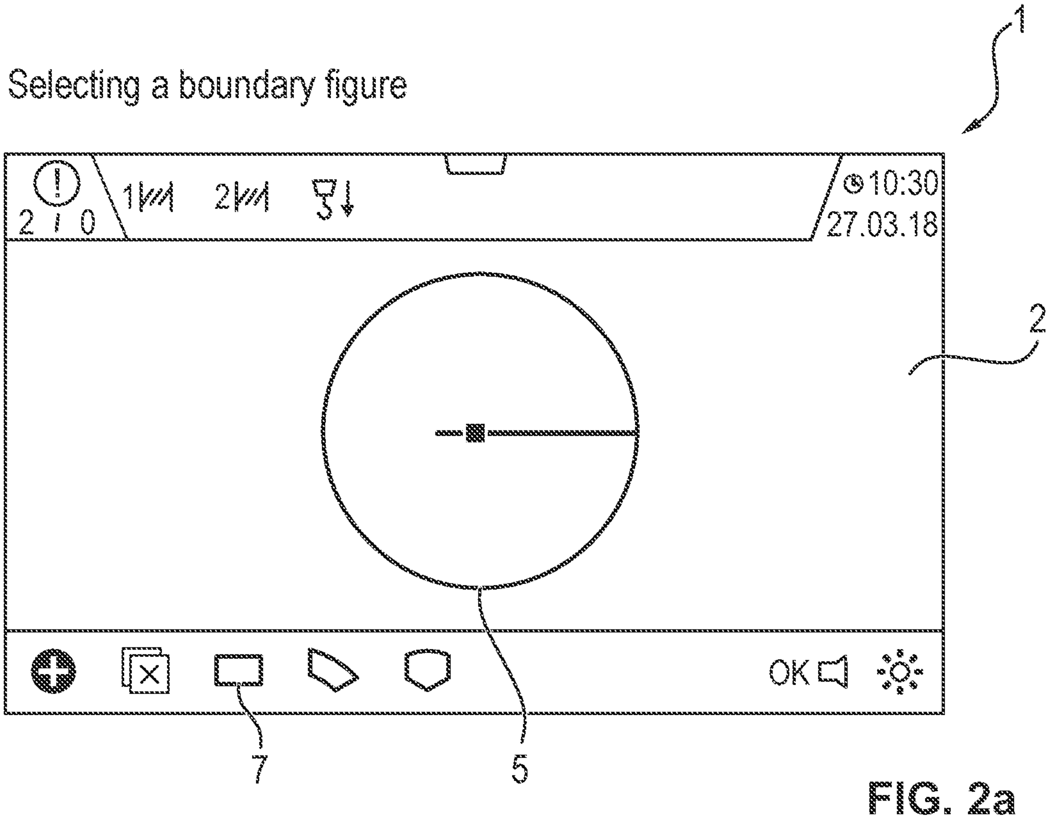
FIGS. 2*a*-2*d* illustrate schematic representations of the touchscreen display of the controller of the crane of FIG. 1, wherein the partial views of FIGS. 2*a* to 2*d* show different screen representations for setting the working region boundaries on the touchscreen display in different setting steps.
Figure 2B:
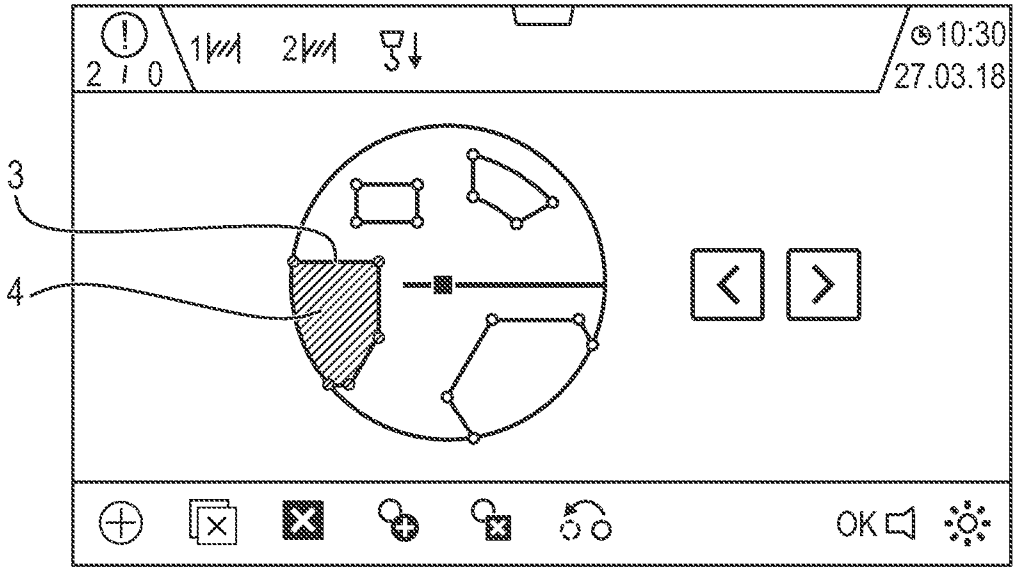
Figure 2C:
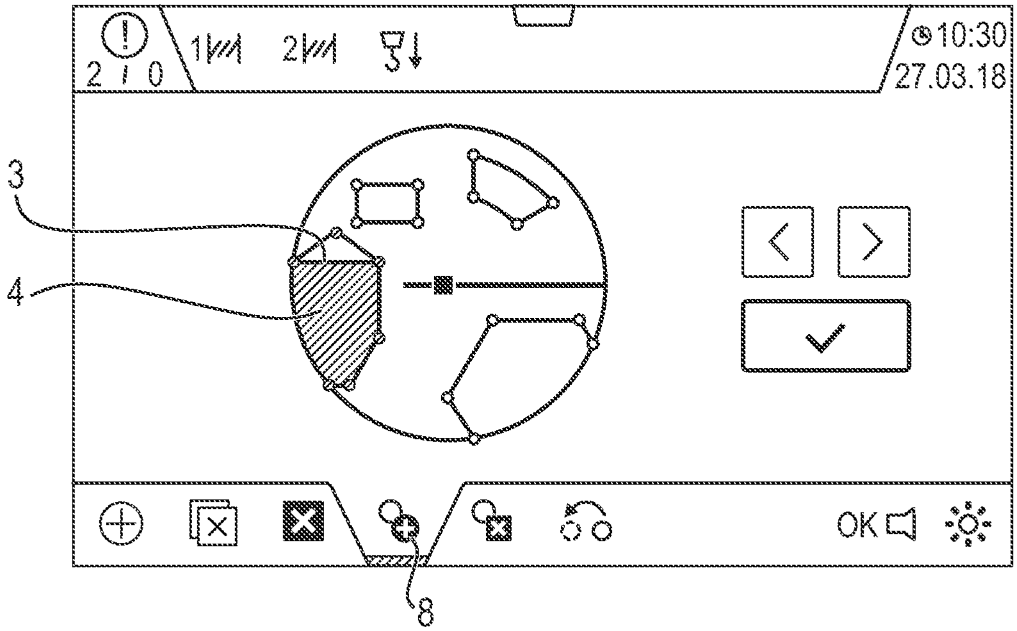
Figure 2D:
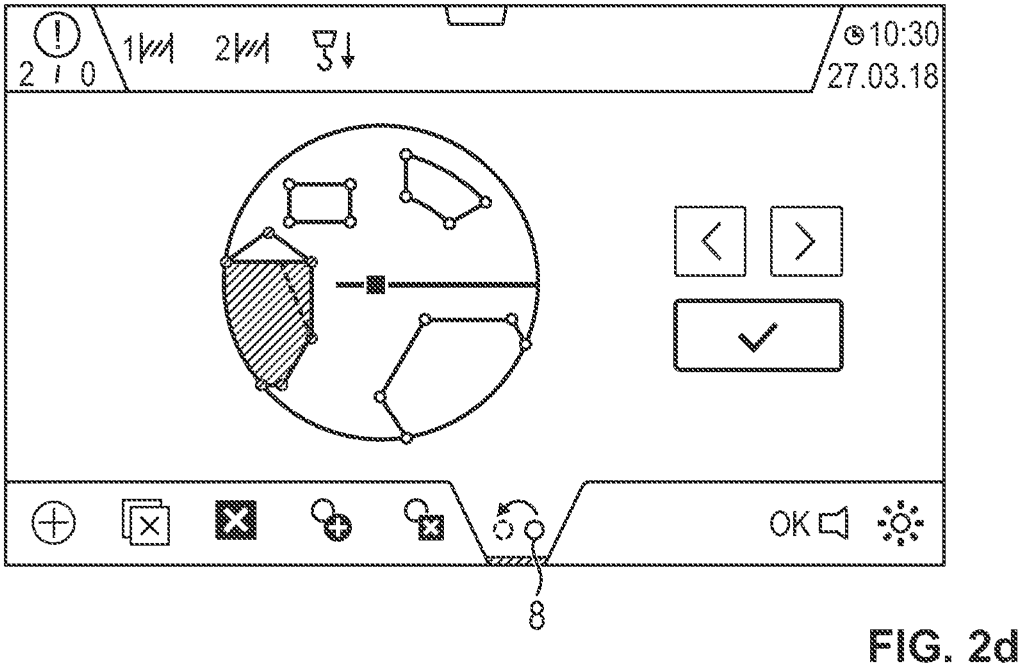
Figure 3:
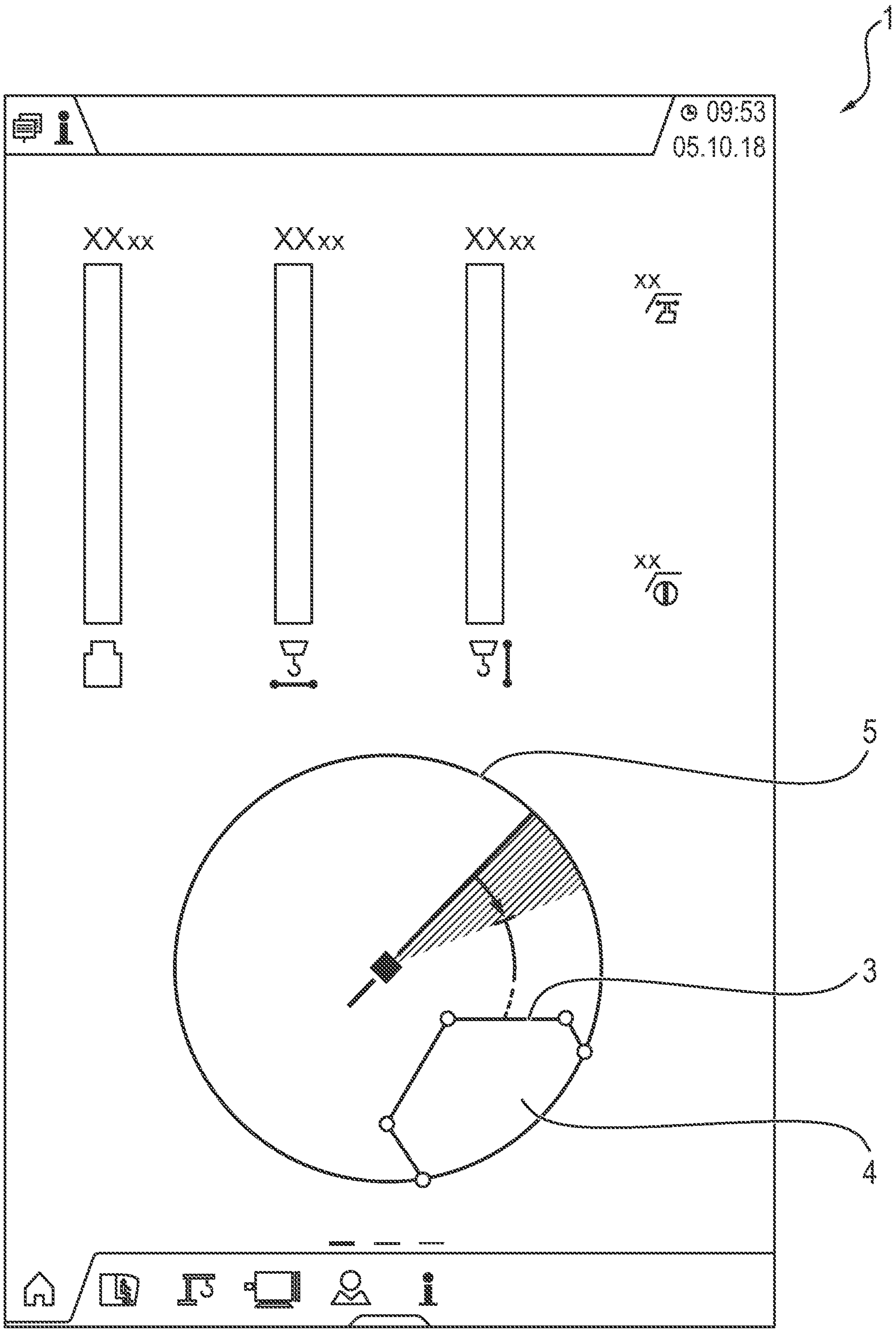
FIG. 3 illustrates a representation of the screen view in crane operation, which, in addition to displaying relevant sensor values, also shows the display of the set working region boundary and the approach of the crane to this limit.

As shown in FIG. 2 and FIG. 3, the controller 1 comprises a screen 2 with touchscreen function, on which different touchscreen display elements can be displayed and operated or controlled by touching the screen.

In order to set up a working region boundary 3 or a whole limiting region 4, the screen 2 shows the crane 10 and its theoretically possible working region 5. In the exemplary tower crane shown, the theoretically possible working region 5 is a circle when viewed from above, which is determined by the maximum possible outreach of the trolley 400, which essentially corresponds to the length of the boom 200, cf. FIG. 2*a*.

Omitted for reasons of clarity, but nevertheless shown on screen 2 is a picture or representation of the crane's surroundings, which, as FIG. 1 shows, can be a construction site with the buildings to be erected there, access roads, other cranes and the like. Such an image of the work surroundings or machine surroundings, which may be superimposed on the working region boundary or limiting region 4 shown in FIG. 2, may be an actual image of the machine or work surroundings and/or a virtual representation of the work surroundings or the structure to be built and/or other components or information useful for the work process.

For this purpose, the screen 2 or the controller 1 may be connected, for example via a router, to a BIM, that is to say a so-called construction site data model, which may be stored in the controller 1 itself or to which the controller 1 has access via said router or other data communication means. Corresponding digital building information and/or construction site information or other relevant digital information that can be displayed on the screen 2, in particular superimposed with the working region boundary 3 to be set, can be imported via a corresponding data interface to the controller 1 from the construction site information model BIM. Virtual representations of the building to be erected and/or of the work surroundings of the crane can in particular be displayed with reference to said BIM data.

Alternatively or additionally to such a virtual representation, however, a real camera-generated representation or a representation generated by another imaging sensor system of the crane surroundings and/or the lifting hook can also be used on the screen 2. For example, at least one camera whose live images are transmitted to the screen 2 can be installed at the crane 10 for this purpose. Such a camera can, for example, be installed on the crane operator's cab or another machine operator's station and can advantageously have at least approximately an axis of view that corresponds to the axis of view of a crane operator in the crane operator's cab or of a machine operator and/or goes from the machine operator's station towards the work tool—in case of the crane 10 towards the lifting hook.

Alternatively or additionally, however, different cameras and/or representations can be recorded from different perspectives and can be transmitted to the screen 2 to be displayed there together with the working region boundary 3. For example, an aerial drone that is equipped with at least one camera or another imaging sensor can be used and can be moved by remote control along with and/or relative to the crane 10.

Figure 4:
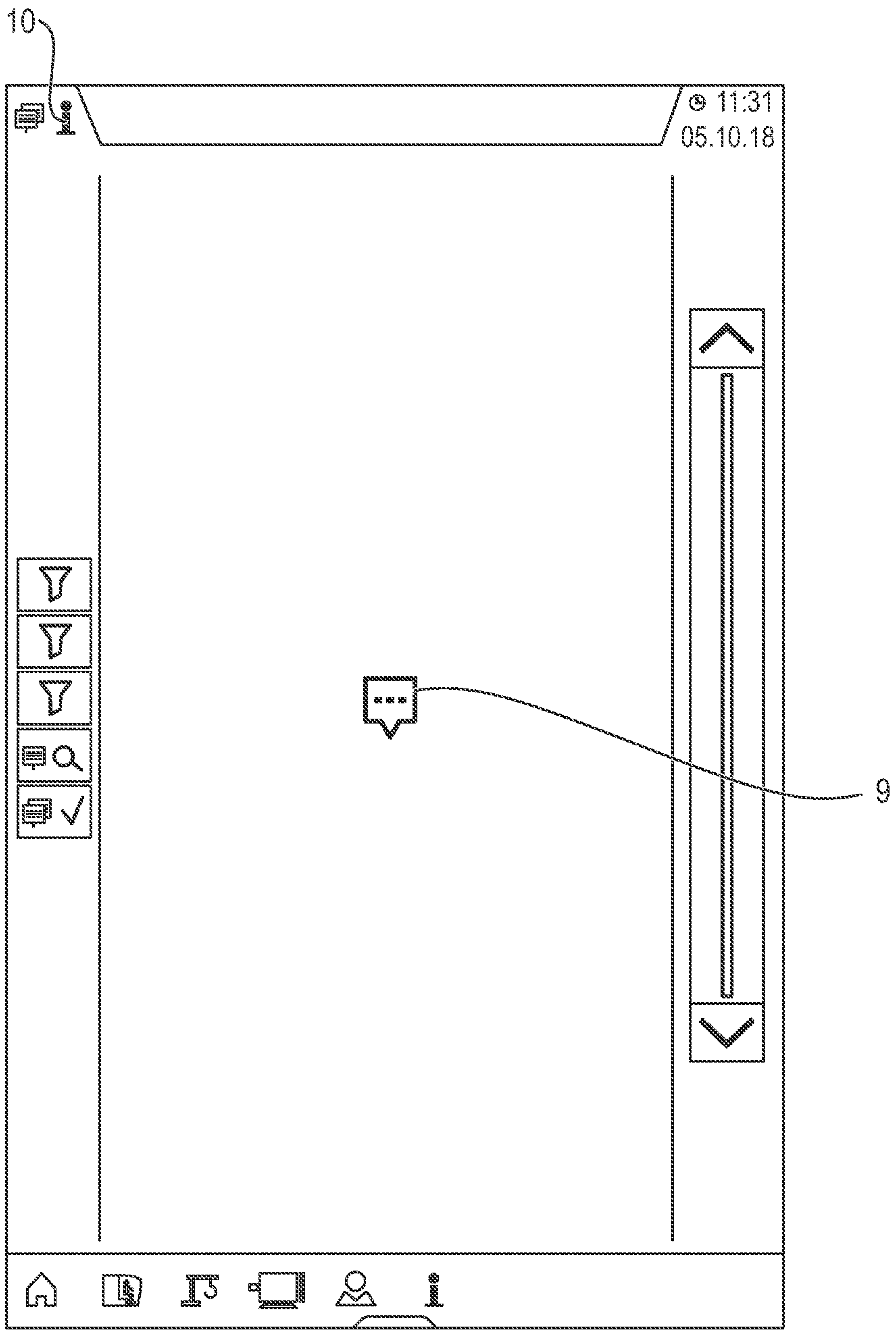
FIG. 4 illustrates a schematic representation of a machine-readable code shown on the touchscreen display of the controller of the crane of the preceding figures, additional information being displayed on the mobile terminal when the code is scanned by a mobile terminal.

As FIG. 4 shows, during working operation of the machine, the current position of the crane 10, in particular of the boom 200 relative to the working region boundary 3 and/or the limiting area 4 in the work surroundings and/or in the theoretical working region 5 can be displayed in order to show the machine operator always up-to-date how close the machine is to the working region boundary 3. As FIG. 4 shows, other relevant operating parameters can be displayed on the screen 2, for example in the form of bar graphs showing, for example, sensor values such as the outreach of the trolley 400, the lowering depth of the lifting hook or the hoisting load.

To set or change the working region boundary 3, the working region delimiting function may first be accessed by touching the touchscreen display 2 or a function symbol arranged thereon. For example, as FIG. 4 shows, different function symbols 6 can visualize different selectable control functions on a lower edge, each in the form of a touchscreen display element, so that a machine operator can select the desired control function by tapping the relevant function symbol 6.

After selecting the working region delimiting function, the controller 1 first displays on the screen 2 the theoretical working region 5 of the crane 10 together with a representation of the crane 10 and any superimposed representation of the work surroundings, cf. FIG. 2*a*.

To set a working region boundary 3 as efficiently as possible with respect to the required contouring, different selection contours 7 are again proposed or displayed on the screen 2 in the form of touchscreen display elements which respond to touching of the screen. Advantageously, these selection contours 7 may be displayed in a border bar of the screen 2 and may comprise, for example, a rectangular selection contour, an arc strip selection contour 7 and a sector-shaped selection contour 7. It is understood that other, differently shaped selection contours can be kept ready if necessary.

If the machine operator, on the basis of the displayed image of the work surroundings or also on the basis of his own perception from the crane operator's cab, determines that, for example, for a working region boundary 3, with which collisions with a building are to be prevented, the rectangular selection contour 7 is best suited, this selection contour 7 is selected by touching the screen 2 and displayed in the work surroundings 5, cf. FIG. 2*b*.

After this pre-configuration step, the working region boundary 3 may be positioned with respect to its position relative to the crane 10 and/or relative to the work environment, may be resized, and may be modified with respect to its shape.

For example, to position the preselected working region boundary 3, the working region boundary 4 surrounded by the working region boundary 3 can be tapped with two fingers simultaneously, and then moved to a new position by wiping along the screen 2 with both fingers.

For example, to change the contouring or shape of the working region boundary 3, a contour point 3*a* of the working region boundary 3 may be tapped and held touched, for example for a longer period of time, to indicate or instruct the controller 1 or the visualization control module to control the on-screen visualization that a contour change should occur. The contour point 3*a* touched by a finger can then be moved to a new position on the screen 2, for example, by wiping along the screen, cf. FIG. 2*d*.

Alternatively or additionally, a change in the contour of the working region boundary 3 can also be achieved by setting an additional contour point, for example by tapping and, if necessary, holding a point outside the pre-configured boundary region 4 and inside the working region 5, cf. FIG. 2*c*. To indicate to the controller 1 or the visualization control module that a new contour point is to be set, it may be required that the boundary region 4 to which an additional contour point is to be set is touched beforehand and, if necessary, remains held in order to activate the relevant boundary region 4.

Alternatively or additionally, the addition of a further contour point and/or the moving of an existing contour point can also be indicated by moving or touching a corresponding function control symbol. As shown in FIGS. 2*c* and 2*d*, for example, a representation of different setting functions by corresponding function symbols 8 may be provided in a border bar during the setting operation or to the setting screen to select the corresponding setting option by touching the corresponding function symbol 8. Advantageously, said function symbols 8 are again in the form of touchscreen display elements which respond to touching the screen 2. In the screen display shown in FIG. 2*c*, the function symbol 8 has been selected to add a contour point for the working region boundary 3, which is then represented by highlighting the symbol or excluding it from the toolbar. According to FIG. 2*d*, the function symbol 8 has been selected for moving an already existing contour point, whereupon this contour point can then be moved by touching a contour point in the displayed working region boundary 3.

Once the working region boundary 3 or the boundary region 4 on the touchscreen display 2 is positioned in the desired manner, contoured and set in size as desired, the controller 1 can be signalled that the setting of the working region boundary 3 has been finalized by pressing an enter key, which in turn can be displayed as a touchscreen display element, for example in the form of a tick, the controller 1 adopts the working region boundary 3 configured on the screen 2 and converts it into corresponding values for the working region boundary function, so that the controller 1 can slow down and deactivate the associated actuator when a relevant machine part approaches said working region boundary 3, for example when the lifting hook approaches a building contour or when the boom 200 approaches the tower of another crane.

If problems arise when setting the working region boundary 3 or when setting other relevant function parameters, screen 2 proposes an additional help function that provides the machine operator with additional information. As FIG. 4 shows, a machine-readable code 9 may be displayed on the screen 2, for example in the form of a QR code. When said machine-readable code 9 is scanned by the camera of a mobile terminal, such as a mobile phone or tablet computer, the scanned code 9 causes the mobile terminal to call up a support resource stored in the mobile terminal itself, but in particular also provided externally by a web server or other database device. For example, the scanned code 9 can cause the mobile terminal to call up a corresponding Internet page on which the relevant information is provided, so that said information is then displayed on the terminal.

The display of the code 9 on the screen 2 may be automated, in particular in response to an erroneous control input or an unexpected control input. For example, if the function symbols 8 for generating a new contour point and moving an existing contour point are touched simultaneously in the screen display shown in FIG. 2*b* or FIG. 2*c* during the previously explained setting of the working region boundary 3, the screen 2 can display a QR code 9 that causes a mobile terminal scanning the code to display a help page for actuating the function symbols 8.

In particular, any error message displayed on the screen 2 may also be presented together with such a machine-readable code 9.

Alternatively, or in addition to such automated code display, the machine-readable code may also be deliberately retrieved or displayed on the screen 2 by the machine operator, for example by touching a help or information symbol 10 displayed on the screen 2 in the form of a touchscreen display element. Such a help symbol 10 may be displayed for each setting step or representation on the screen 2, cf. for example FIG. 4.

We claim:

1. A method for controlling a materials handling and/or construction machine comprising a crane and/or a cable excavator, the method comprising:

selecting different control functions on a screen of a controller with a touchscreen function, wherein the selecting comprises touching a control function symbol, and respective functional parameters of the selected control function are set;

displaying on the screen a working region boundary of a working region delimiting function for automatically deactivating and/or slowing down at least one actuator together with a display of the materials handling and/or construction machine and/or the work surroundings thereof in the form of a touchscreen display element when the working region boundary is reached and is adjusted by touching and moving the working region boundary on the screen relative to the display of the materials handling and/or construction machine and/or the work surroundings thereof;

providing a machine-readable code by an operating aid on the screen; and scanning the machine-readable code by a mobile terminal, wherein the scanning causes the mobile terminal to call up additional information on the selected control function and to display the additional information on the mobile terminal.

2. The method of claim 1, further comprising preconfiguring a contour of the working region boundary by touching one of a plurality of selection contours displayed on the screen.

3. The method of claim 1, further comprising changing a contour of the working region boundary by tapping a contour point of the working region boundary and moving the tapped contour point by wiping along the screen.

4. The method of claim 1, further comprising changing a contour of the working region boundary by adding an additional contour point, wherein the additional contour point is created by tapping a screen point spaced from the previously displayed working region boundary.

5. The method of claim 1, further comprising moving and newly positioning the working region boundary relative to the materials handling and/or construction machine by touching on the screen and wiping along the screen.

6. The method of claim 1, wherein a distinction is made between moving the working region boundary and changing the shape of the working region boundary by touching the screen differently, wherein touching the screen differently comprises tapping once or several times and/or by touching with one or more fingers.

7. The method of claim 1, further comprising automatically displaying the machine-readable code on the screen of the controller upon input of an erroneous and/or unforeseen control command.

8. The method of claim 7, further comprising displaying the machine-readable code upon touching an auxiliary and/or information symbol displayed on the screen in the form of a touch screen display element.

9. The method of claim 1, further comprising displaying the machine-readable code upon touching an auxiliary and/or information symbol displayed on the screen in the form of a touch screen display element.

10. The method of claim 1, further comprising:

generating a representation of the work surroundings of the materials handling and/or construction machine displayed on the screen on the basis of image data from a camera and/or digital data from a building information model (BIM); and displaying an inputter for inputting control commands on the screen at least at times simultaneously with the representation of the machine surroundings and/or the work tool.

11. The method of claim 10, further comprising generating a superimposed screen representation in a manner of a virtual reality image on the screen by a display controller, wherein the superimposed screen representation in the manner of a virtual reality image is assembled from a camera image of the machine surroundings and a virtual representation of the machine surroundings and/or a building part comprising the received image data of the camera and the received digital data from the building information model (BIM).

12. A device for controlling a construction and/or materials handling machine comprising a crane and/or cable excavator, the device comprising:

a controller which comprises a screen with a touch screen function, wherein different control functions are represented on the screen by control function symbols and are selectable by touching one of the control function symbols; and selectors on the screen for setting functional parameters of a selected control function of the control functions;

wherein the controller comprises a working region boundary function adapted to display a working region boundary on the screen with a representation of the materials handling and/or construction machine and/or the work surroundings thereof in the form of a touch screen display element and to adjust the working region boundary on the screen relative to the materials handling and/or construction machine by touching and moving the working region boundary, wherein an operating aid on the screen comprises a machine-readable code which, when scanned by a mobile terminal, causes the mobile terminal to call up additional information on the selected control function and display the additional information on the mobile terminal.

13. The device of claim 12, wherein a working region boundary function of the controller is adapted to preconfigure a contour of the working region boundary by touching one of a plurality of selection contours displayed on the screen.

14. The device of claim 12, wherein a working region boundary function of the controller is adapted to change a contour of the working region boundary by tapping a contour point of the working region boundary and moving the tapped contour point by wiping along the screen.

15. The device of claim 12, wherein a working region boundary function of the controller is adapted to change a contour of the working region boundary by adding an additional contour point, wherein the additional contour point is generated by tapping a screen point spaced from the previously displayed working region boundary.

16. The device of claim 12, wherein a working region boundary function of the controller is adapted to move and position the working region boundary a new relative to the materials handling and/or construction machine by touching on the screen and wiping along the screen.

17. The device of claim 12, wherein a working region delimiting function of the controller is adapted to distinguish between moving the working region boundary and changing the shape of the working region boundary by touching the screen differently, wherein touch the screen differently comprises tapping once or several times and/or by touching with one or more fingers.

18. The device of claim 12, wherein the machine-readable code comprises a QR code.

19. The device of claim 12, wherein the operating aid is adapted to automatically display a machine-readable code upon input of an erroneous and/or unpredictable control command.

20. The device of claim 12, wherein the operating aid is adapted to display the machine-readable code upon touching an auxiliary and/or information symbol displayed on the screen in the form of a touch screen display element.

21. The device of claim 17, further comprising a display controller for generating a superimposed screen representation in the manner of a virtual reality image on the screen comprising a camera image of the machine surroundings and a virtual representation of the machine surroundings and/or a building part comprising the received image data from the camera and the received digital data from the building information model (BIM).

22. A materials handling and/or construction machine comprising a crane or a cable excavator, wherein the materials handing and/or construction machine comprises the device of claim 12.

* * * * *